(12) United States Patent
Oliver

(10) Patent No.: US 9,060,161 B2
(45) Date of Patent: Jun. 16, 2015

(54) AUTOMATIC DVR CONFLICT RESOLUTION

(75) Inventor: Michael R. Oliver, Wayne, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 139 days.

(21) Appl. No.: 13/538,395

(22) Filed: Jun. 29, 2012

(65) Prior Publication Data

US 2014/0003797 A1     Jan. 2, 2014

(51) Int. Cl.
  *H04N 5/76*     (2006.01)
  *H04N 21/45*    (2011.01)
  *H04N 5/775*    (2006.01)
  *H04N 21/458*   (2011.01)
  *H04N 5/782*    (2006.01)

(52) U.S. Cl.
  CPC ............ *H04N 5/775* (2013.01); *H04N 21/4583* (2013.01); *H04N 5/782* (2013.01); *H04N 5/76* (2013.01)

(58) Field of Classification Search
  CPC ......... H04N 5/775; H04N 5/76; H04N 21/45; H04N 21/4583
  USPC ................................................. 386/291–293
  See application file for complete search history.

(56) References Cited

U.S. PATENT DOCUMENTS

| | | | |
|---|---|---|---|
| 2004/0013409 A1* | 1/2004 | Beach et al. ..................... | 386/83 |
| 2006/0104611 A1* | 5/2006 | Gildred et al. .................. | 386/83 |
| 2007/0174336 A1* | 7/2007 | Day et al. .................. | 707/104.1 |
| 2012/0301116 A1* | 11/2012 | Ellis .............................. | 386/292 |
| 2013/0031479 A1* | 1/2013 | Flowers ........................ | 715/716 |
| 2013/0055312 A1* | 2/2013 | Cheng et al. .................... | 725/49 |
| 2013/0073987 A1* | 3/2013 | Nush ............................. | 715/753 |
| 2013/0111527 A1* | 5/2013 | Poniatowski et al. ........... | 725/58 |

* cited by examiner

*Primary Examiner* — Gelek W Topgyal

(57) ABSTRACT

A device receives user input to schedule a program to record at a future time and recording conflict resolution characteristics including at least one of: an indication whether the user wishes to watch the program soon after the program begins or whether the user wishes to watch the program a period of time after the program begins, an indication whether the user cares about viewing only the end of the program or the entire program, or an indication whether, if the program is to be recorded as part of a series, the series needs to be recorded sequentially. The device identifies a conflict in the scheduling of the recording of the program and one or more other programs, and resolves the identified conflict based on one or more of the recording conflict resolution characteristics.

19 Claims, 15 Drawing Sheets

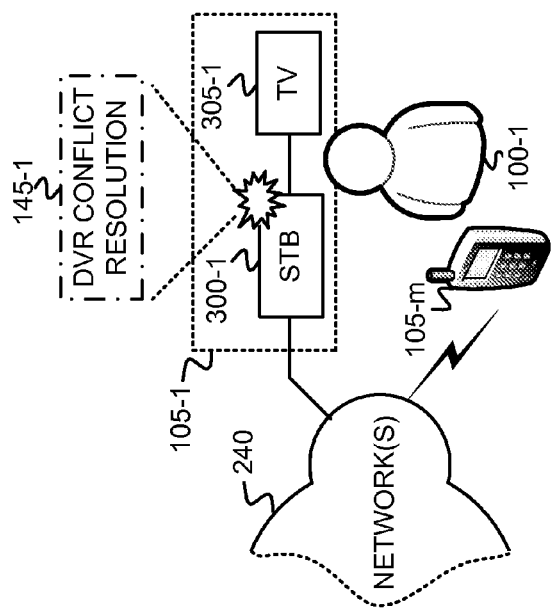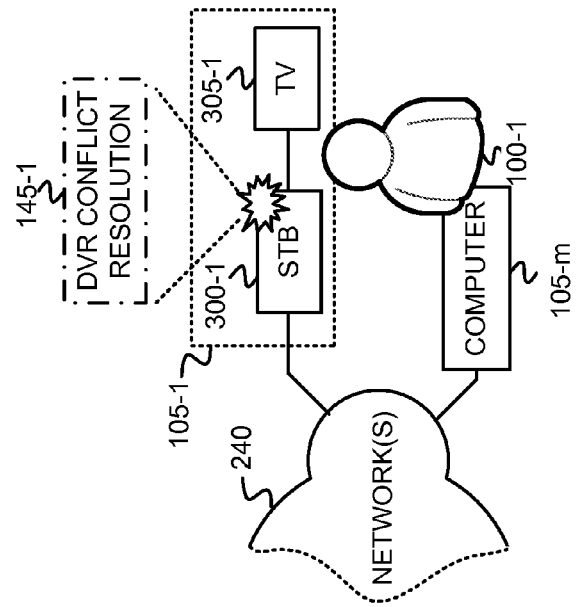

AUTOMATIC DVR CONFLICT RESOLUTION

BACKGROUND

Set-Top Boxes (STBs) are used for selecting among channels on a network, such as, for example, a cable network (e.g., an optical fiber network), to enable content transmitted on those channels to be displayed on display devices (e.g., televisions) connected to the STBs. The STB user may use a remote device to switch channels on the STB, or to provide input for controlling other functions on the STB. The remote device may be used, for example, for controlling the STB's digital video recorder (DVR), for accessing a digital television programming guide, or for turning on or off specific settings on the STBs (e.g., turning on closed captioning, setting display width, etc.). The STB's DVR may include functionality for scheduling the recurring recording of a series of television programming. Therefore, the STB's DVR may permit a device user to schedule the weekly recording of the episodes of each of the user's favorite television series.

BRIEF DESCRIPTION OF THE DRAWINGS

FIGS. 3A and 3B depict examples of the network environment of FIG. 2 where the devices include different types of devices;

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein enable the automatic resolving of DVR conflicts when a DVR is scheduled to record too many programs during a given period of time. For example, if a DVR of a STB only has two tuners available for recording programs, and three or more programs are scheduled to record during a certain period of time, then a DVR conflict exists during the period of time. Until the DVR conflict is resolved, one of the scheduled programs will fail to record at the scheduled time. As described herein, a user may specify additional conflict resolution characteristics which may be used to automatically resolve DVR recording conflicts.

Figure 1:
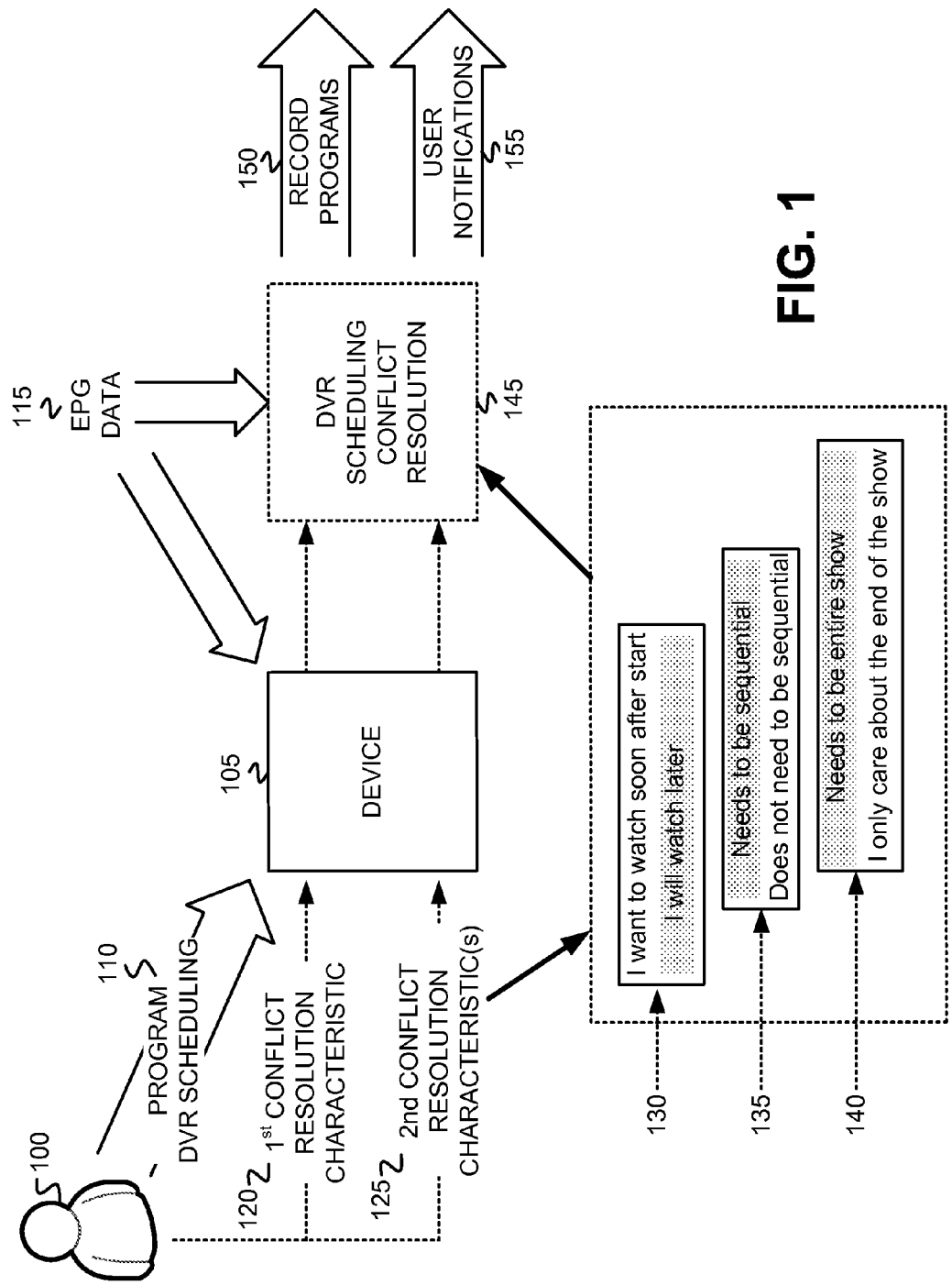
FIG. 1 is a diagram that depicts an overview of automatic DVR scheduling conflict resolution based on multiple conflict resolution characteristics specified by a DVR user.

FIG. 1 is a diagram that depicts an overview of automatic DVR scheduling conflict resolution based on multiple conflict resolution characteristics specified by a DVR user. As shown in FIG. 1, a user 100 may interact with a device 105 to engage in program DVR scheduling 110. Program DVR scheduling 110 may include the entering of input by user 100 to schedule, via device 105, the recording of content (e.g., video content) by a DVR unit at device 105, or at another device (not shown). Program DVR scheduling 110 may include, for example, selection of specific programs from an Electronic Program Guide (EPG) 115 to schedule the recording of the specific programs as a one-time recording, or a part of a series. Device 105 may include one or more devices that may be used for scheduling the recording of programs, such as, for example, a computer (e.g., desktop, laptop, palmtop or tablet computer), a Personal Digital Assistant (PDA), a cellular telephone (e.g., a smart phone), a set-top box (STB) (e.g., connected to a television), or a stand-alone DVR device.

In conjunction with program DVR scheduling 110, user 100 may supply a first conflict resolution characteristic 120 and one or more second conflict resolution characteristics 125 to device 105 for use in implementing automatic DVR scheduling conflict resolution. The first conflict resolution characteristic may include, for example, a relative priority associated with the recording of the specific program. User 100 may specify multiple different priorities (e.g., high, medium, low) that indicate the priority of a program relative to other programs that are scheduled for recording during a same time period. For example, if program A is scheduled for recording at 8 pm with a priority of high, program B is scheduled for recording at 8 pm with a priority of low, and program C is scheduled for recording at 8 pm with a priority of high, then, assuming a conflict (e.g., only two tuners available at 8 pm), programs A and C will be recorded instead of program B. Second conflict resolution characteristic(s) 125 may include one or more additional characteristics, beyond program scheduling priorities, that may be associated with each scheduled program and which can be used in implementing automatic DVR scheduling conflict resolution. Second conflict resolution characteristic(s) 125 may include one or more of the following: 1) an indication 130 whether user 100 wishes to watch the program soon after the program begins or whether user 100 wishes to watch the program a period of time after the program begins, 2) an indication 135 whether, if the program is to be recorded as part of a series, the series needs to be recorded sequentially, and/or 3) an indication 140 whether user 100 cares about viewing only the end of the program or the entire program. Conflict resolution characteristic(s) 125 may include additional characteristics beyond those described above.

Device 105, or another device (e.g., a STB), may implement an automatic DVR scheduling conflict resolution process 145 using EPG data 115, the user's program DVR scheduling 110, confliction resolution characteristic 120, and conflict resolution characteristic(s) 125 to identify and automatically resolve any conflicts in the recording of programs set to be recorded by user 100. DVR scheduling conflict resolution process 145 may result in programs being recorded 150, and user notifications 155 may be sent to user 100 notifying the user of changes in DVR scheduling that may have occurred based on process 145.

Figure 2:
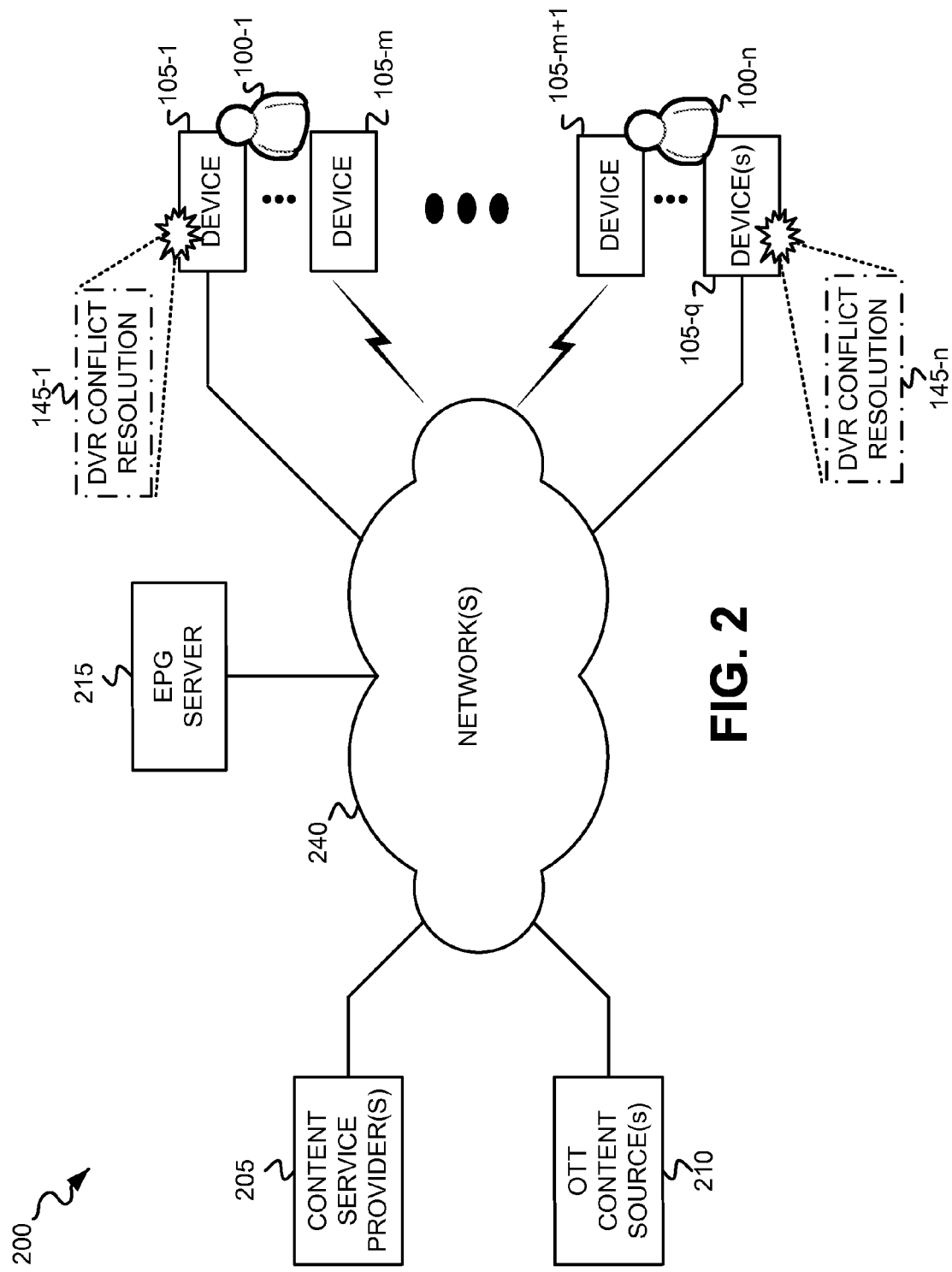
FIG. 2 is a diagram that depicts an exemplary network environment in which automatic DVR conflict resolution may be implemented at various different devices that include DVR functionality.

FIG. 2 is a diagram that depicts an exemplary network environment 200 in which automatic DVR conflict resolution may be implemented at various different devices that include DVR functionality. As shown in FIG. 2, network environment 200 may include a content service provider(s) 205, an Over-the-Top (OTT) content source(s) 210, an EPG server 215, one or more devices 105-1 through 105-m (where m is greater than or equal to one) associated with a first user 100-1, one or more devices 105-m+1 through 105-q (where q is greater than, or equal to, m+1), and a network 240.

Content service provider(s) 205 may include one or more devices, or a network of devices, that deliver content to devices 105-1 through 105-q. Content service provider(s) 205 may deliver the content to devices 105-1 through 105-q via one or more channels (e.g., Quadrature Amplitude Module (QAM) channels) over network(s) 240. The content may include, for example television video programs.

OTT content source(s) 210 may include one or more network devices that may deliver content to devices 105-1 through 105-q via OTT services. EPG server 215 may deliver EPG data that includes various data related to the display of an electronic program guide at devices 110-1 through 110-n via network 240. An "electronic program guide," as referred to herein, includes menus of television program scheduling information that are shown by a content service provider (e.g., cable or satellite TV provider) to its viewers and that displays current and upcoming television programming. An EPG permits viewers to navigate through scheduling information interactively, selecting and discovering TV programming by time, station, or title. EPGs enable the viewer to identify desired programming using interactive menus and, if DVR functionality is present in the viewer's system, may permit the viewer to schedule the recording of desired programming via the EPG.

Devices 105-1 through 105-q may each include a computer (e.g., desktop, laptop, palmtop or tablet computer), a PDA, a cellular telephone (e.g., a smart phone), a STB (e.g., connected to a television), or a stand-alone DVR device. As shown, one of devices 105-1 through 105-m may include DVR confliction resolution functionality 145-1 that may resolve scheduling conflicts for a DVR that records programs based on scheduling instructions from user 100-1. Also as shown, one of devices 105-m+1 through 105-q may include DVR confliction resolution functionality 145-n that may resolve scheduling conflicts for a DVR that records programs based on scheduling instructions from user 100-n.

Network(s) 240 may include one or more networks of various types including, for example, a cable network (e.g., an optical cable network), a satellite network, a telecommunications network (e.g., a Public Switched Telephone Network (PSTN) or Public Land Mobile Network (PLMN)), an Advanced Television Systems Committee (ATSC) standards network, a local area network (LAN), a wide area network (WAN), a metropolitan area network (MAN), an intranet, and/or the Internet. Network(s) 240 may, in some implementations, include one or more QAM channels (or other types of modulated or broadcast channels) for delivering content and EPG data to devices 105-1 through 105-q.

The configuration of network components of network environment 200 illustrated in FIG. 2 is for illustrative purposes only. Other configurations may be implemented. Network environment 200 may include additional, fewer and/or different components than those depicted in FIG. 2.

FIGS. 3A and 3B depict examples of network environment 200 of FIG. 2 where devices 105-1 through 105-m include different types of devices. For example, as shown in the example of FIG. 3A, device 105-1 includes a STB 300-1 and an associated television (TV) 305-1, and device 105-m includes a cellular telephone (e.g., a smartphone) or a PDA having a wireless connection to network 240. In this implementation, user 100-1 may interact with STB 300-1 and TV 305-1 via a remote control device (not shown) to schedule the recording of programs. STB 300-1 may include a device that, among other components, includes a tuner and connects to TV 305-1. STB 300-1 may receive an external source of signal (e.g., content from content service provider(s) 205 via network(s) 240) and may turn the signal into content that is displayed on TV 305-1, or another type of display device. User 100-1 may also interact with cellular telephone 105-m to schedule the recording of programs.

In another example shown in FIG. 3B, device 105-1 includes STB 300-1 and television (TV) 305-1, and device 105-m includes a computer (e.g., desktop, laptop, palmtop or tablet computer having a wired or wireless connection to network 240). In this implementation, user 100-1 may interact with STB 300-1 and TV 305-1 via a remote control device (not shown) to schedule the recording of programs. User 100-1 may also interact with device 105-m to schedule the recording of programs.

Figure 4:
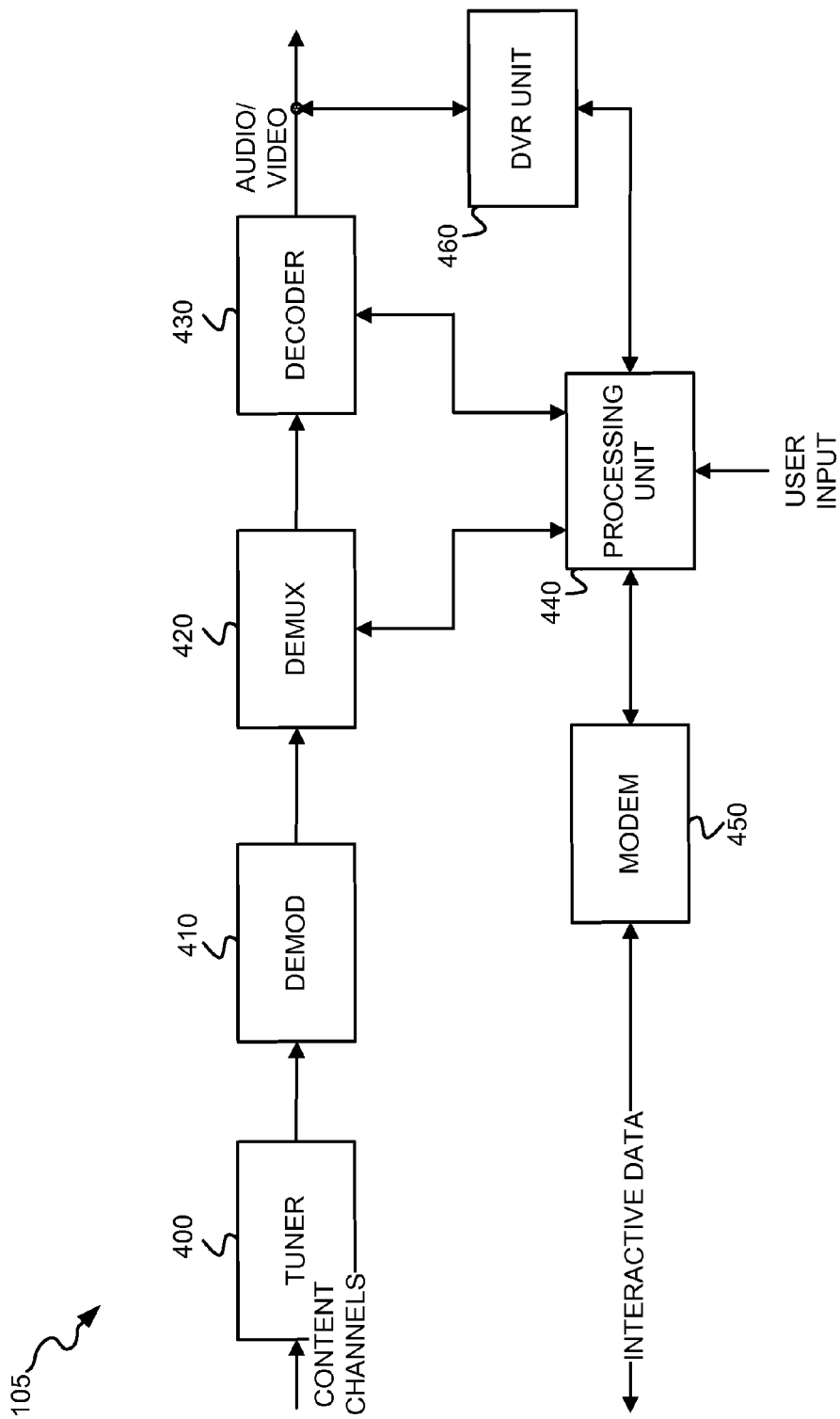
FIG. 4 depicts exemplary components of a device of FIG. 1, where the device is implemented as a set-top box.

FIG. 4 depicts exemplary components of device 105, where device 105 is implemented as STB 300. Device 105 may include a tuner 400, a demodulator 410, a demultiplexer 420, a decoder 430, a processing unit 440, a modem 450, and a DVR unit 460. Tuner 400 may select and tune to specific broadcast television information by tuning to one of many different input channels. Each channel may be digitally modulated using, for example, QAM, though other types of modulation may be used. Demodulator 410 may demodulate the information in the channel selected by tuner 400 to produce a transport stream (e.g., MPEG-2 or MPEG-4 transport stream) containing the audio, video and/or other information related to a selected TV program.

Demultiplexer 420 may select and decrypt compressed audio and video from the transport stream for the particular TV program that the device user wishes to watch. Decoder 430 may decode and decompress the decrypted audio and video information for the selected TV program. Processing unit 440 may include, for example, a microprocessor that controls the operations performed by tuner 400, demodulator 410, demultiplexer 420, decoder 430, modem 450 and DVR unit 460 based on user input (e.g., input received from a device user 100 via a remote control device). Modem 450 may send and receive interactive data (e.g., EPG data) that may be processed by processing unit 440. DVR unit 460 may digitally record, and store, audio and video content associated with the particular TV program decoded by decoder 430.

The configuration of components of device 105 in FIG. 4 is for illustrative purposes only. Other configurations may be implemented. Device 105 may include additional, fewer and/or different components than those depicted in FIG. 4.

Figure 5:
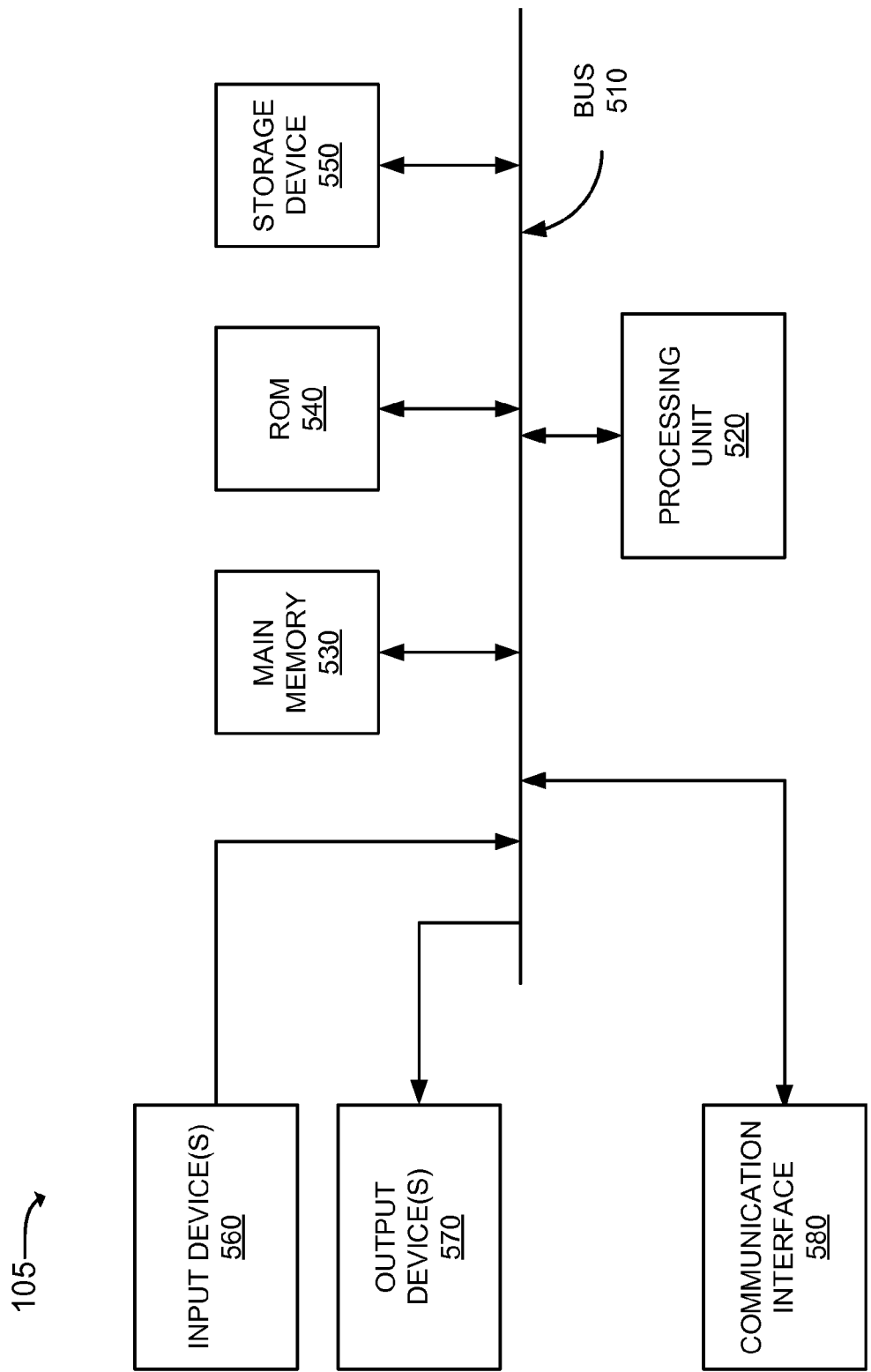
FIG. 5 is a diagram of exemplary components of the device of FIG. 1, where the device is implemented as a computer, a personal digital assistant, or a cellular telephone.

FIG. 5 is a diagram of exemplary components of device 105, where device 105 is implemented as a computer (e.g., desktop, laptop, palmtop or tablet computer), a PDA, or a cellular telephone (e.g., a smart phone). Content service provider(s) 205, OTT content source(s) 210, and EPG server 215 may be similarly configured. Device 105 may include a bus 510, a processing unit 520, a main memory 530, a read only memory (ROM) 540, a storage device 550, an input device(s) 560, an output device(s) 570, and a communication interface 580. Bus 510 may include a path that permits communication among the elements of device 105.

Processing unit 520 may include one or more processors or microprocessors, or processing logic, which interprets and executes instructions. Main memory 530 may include a random access memory (RAM) or another type of dynamic storage device that stores information and instructions for execution by processing unit 520. ROM 540 may include a ROM device or another type of static storage device that stores static information and instructions for use by processing unit 520. Storage device 550 may include a magnetic and/or optical recording medium. Main memory 530, ROM 540, and storage device 550 may each be referred to herein as a "tangible non-transient computer-readable medium."

Input device 560 may include one or more mechanisms that permit user 100 to input information to device 105, such as, for example, a keypad or a keyboard, a display with a touch sensitive panel, voice recognition and/or biometric mechanisms, etc. Output device 570 may include one or more mechanisms that output information to user 100, including a display, a speaker, etc. Communication interface 580 may include any type of transceiver that enables device 105 to communicate with other devices and/or systems. For example, communication interface 580 may include wired or wireless transceivers for communicating via network(s) 240.

The configuration of components of device 105 in FIG. 5 is for illustrative purposes only. Other configurations may be implemented. Device 105 may include additional, fewer and/or different components than those depicted in FIG. 5.

Figure 6:
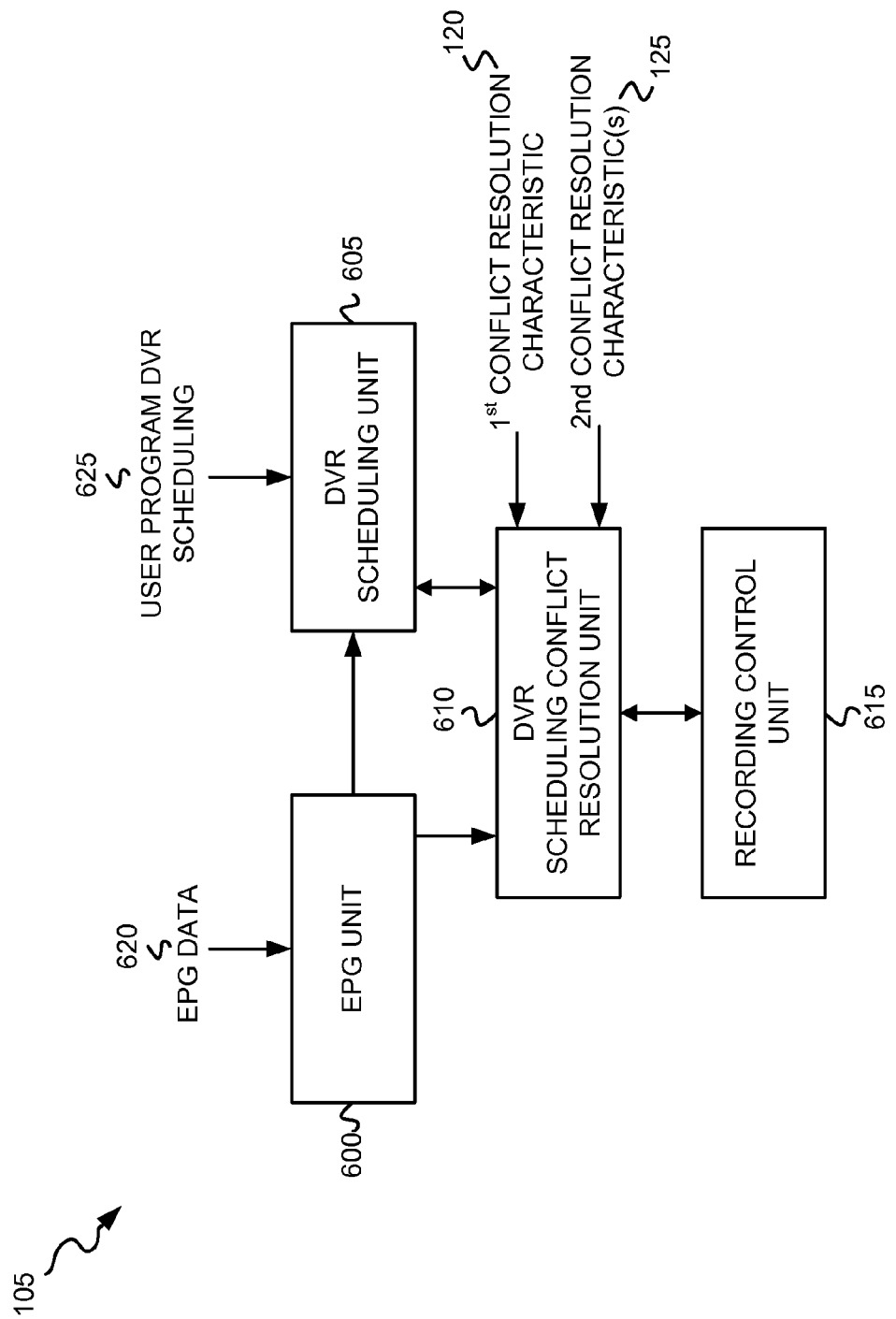
FIG. 6 is a diagram of exemplary functional components of the device of FIG. 1.

FIG. 6 is a diagram of exemplary functional components of device 105. The functional components shown in FIG. 6 may be implemented in hardware and/or software within device 105. For example, in one implementation, the functional components of FIG. 6 may be implemented as instructions stored in memory 530 that are executed by processing unit 520 (or processing unit 440 and/or DVR unit 460). The functional components of device 105 may include an EPG unit 600, a DVR scheduling unit 610, a DVR scheduling conflict resolution unit 610, and a recording control unit 615.

EPG unit 600 may receive EPG data 620 (e.g., from EPG server 215) and may provide television program scheduling data to DVR scheduling unit 605 and to DVR scheduling conflict resolution unit 610. DVR scheduling unit 605 may process the television program scheduling data, in conjunction with program DVR scheduling input 110 received from user 100, to schedule the future recording of a program or a program series. The program DVR scheduling input 110 may include, among other parameters, an identification of the program or program series being scheduled. DVR scheduling unit 605 may supply program scheduling instructions to DVR scheduling conflict resolution unit 610 which may identify the occurrence of scheduling conflicts (e.g., more programs scheduled to record over a given time period that can be served by the number of tuners in the STB), and may attempt to resolve the scheduling conflicts based on conflict resolution characteristics 120 and 125. DVR scheduling conflict resolution unit 610 may supply instructions to recording control unit 615 which may, in turn, control the recording of programs.

Figure 7:
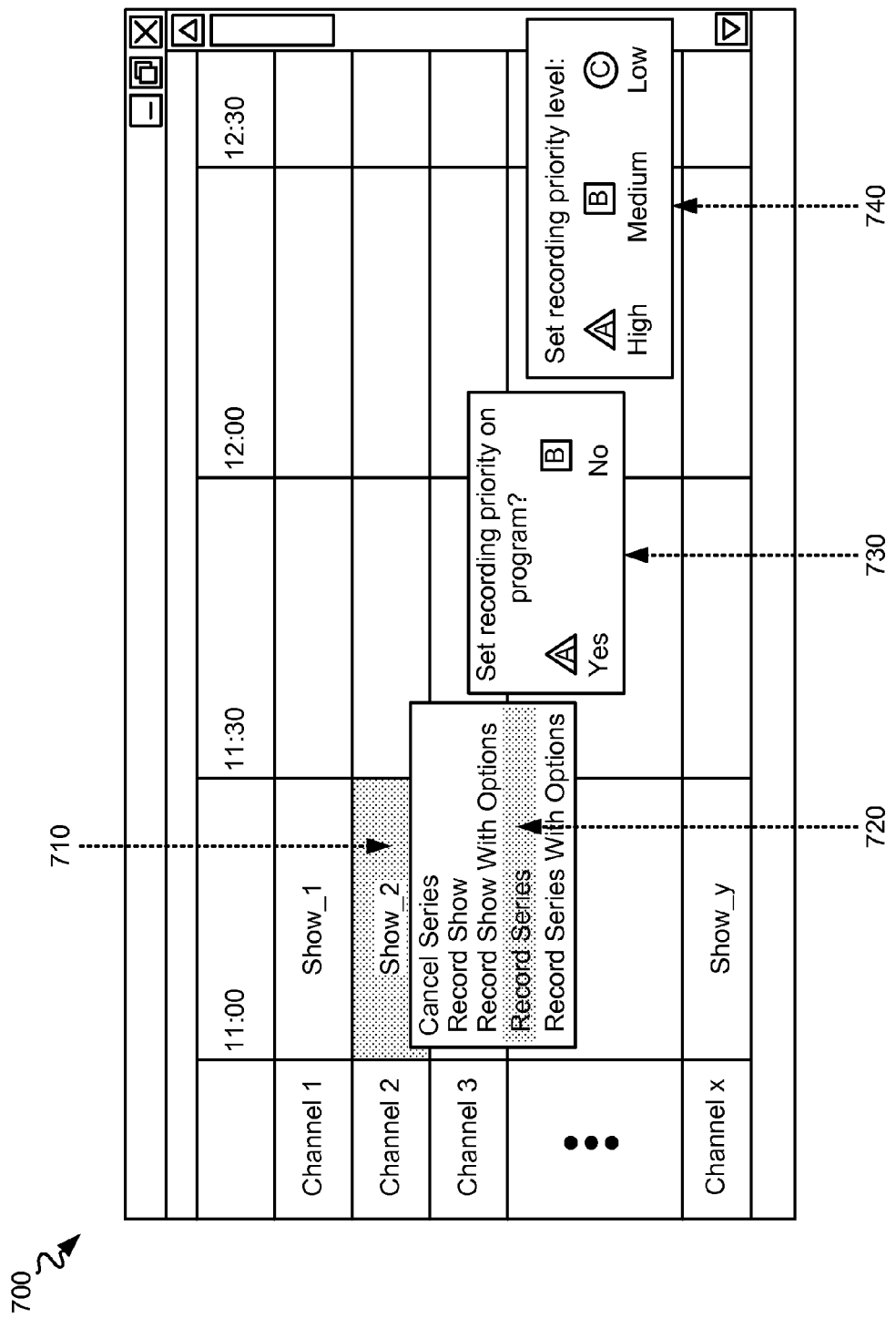
FIG. 7 depicts an example of user entry of a first conflict resolution characteristic that includes setting a priority level for a program or a program series.

FIG. 7 depicts an example of user entry of a first conflict resolution characteristic that includes setting a priority level for a program or a program series. As shown in FIG. 7, a scheduling guide 700 may be used to select a program 710 to be recorded in the future. In response to selection of the program from guide 700, user 100 may choose a number of different recording options 720 such as, for example, "record show" or "record series." Upon selection of a recording option 720, an optional recording priority 730 for the program may be selected (e.g., press "A" for selecting a recording priority or press "B" if no recording priority is to be selected). A recording priority level 740 may then be specified for the selected program. For example, a "A" may be selected for a "high" priority, a "B" may be selected for a "Medium" priority, or a "C" may be selected for a "low" priority.

Figure 8:
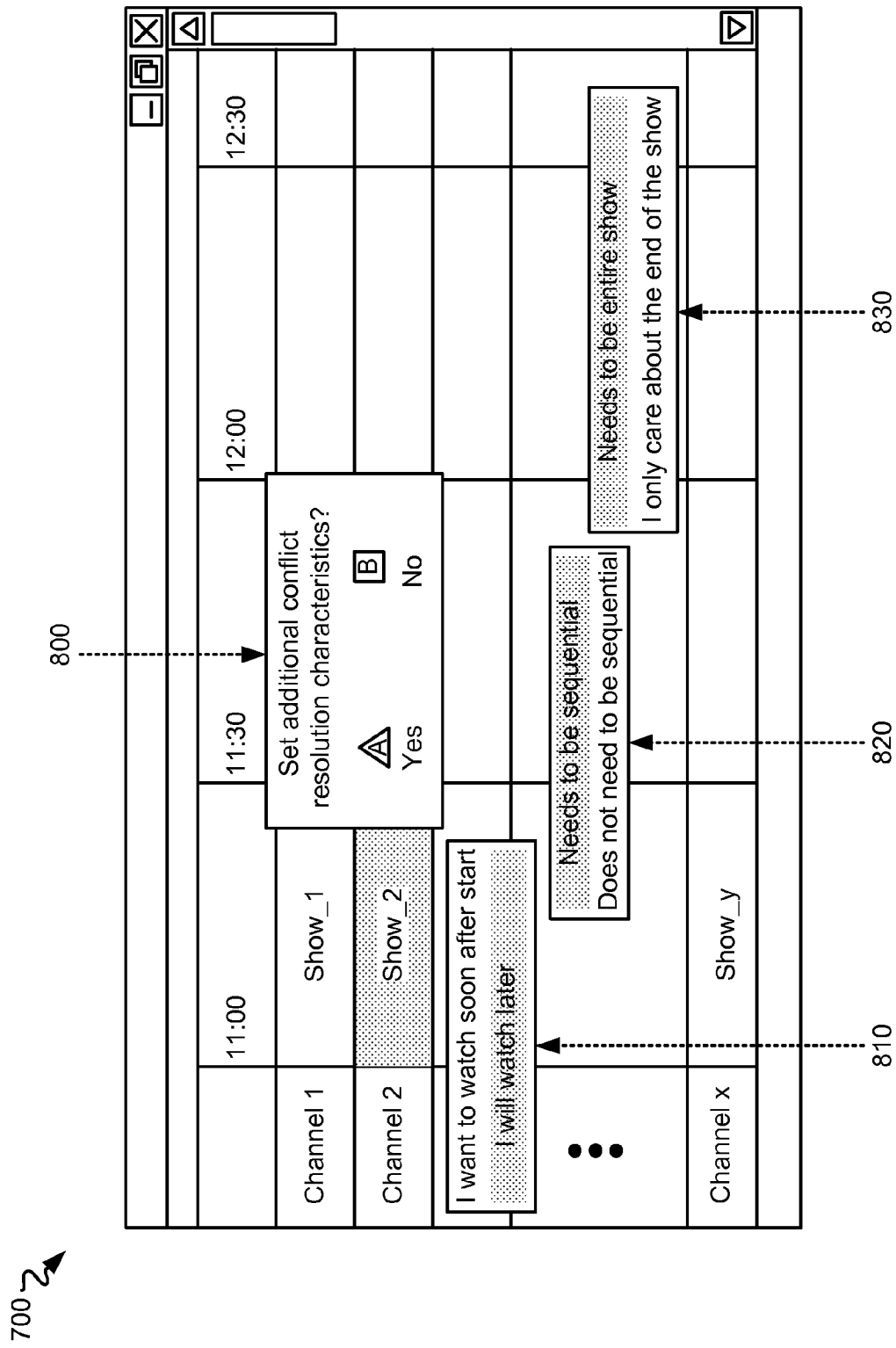
FIG. 8 depicts examples of additional conflict resolution characteristics that may be set by a user in accordance with embodiments described herein.

FIG. 8 depicts examples of additional conflict resolution characteristics that may be set by user 100 in accordance with embodiments described herein. User 100 may, from scheduling guide 700, choose to set additional conflict resolution characteristics 800 in conjunction with, or instead of, that shown with respect to FIG. 7. For example, user 100 may select an "A" if user 100 wishes to set additional conflict resolution characteristics or "B" if user 100 does not wish to set additional conflict resolution characteristics. If user 100 chooses to set additional conflict resolution characteristics, one or more conflict resolution characteristics may be presented to user 100 as user-selectable choices.

For example, FIG. 8 depicts a conflict resolution characteristic 810 that may be presented to user 100 that permits user 100 to provide an indication whether user 100 wishes to watch the program soon after the program begins or whether user 100 wishes to watch the program a period of time after the program begins. If user 100 wishes to watch the program soon after the program begins, then user 100 may select "I want to watch soon after start." If user 100 wishes to watch the program at some later period of time after the program begins, then user 100 may select "I will watch later."

As another example, FIG. 8 depicts a further conflict resolution characteristic 820 that may be presented to user 100 to permit user 100 to provide an indication whether, if the program is to be recorded as part of a series, the series needs to be recorded sequentially. If user 100 wishes the programs in the series to be recorded in sequence (e.g., in the order in which they were originally aired), then user 100 may select "needs to be sequential." If user 100 does not care if the programs in the series are recorded in sequence, then user 100 may select "does not need to be sequential."

In an additional example, FIG. 8 depicts yet another conflict resolution characteristic 830 that may be presented to user 100 to permit user 100 to provide an indication whether user 100 cares about viewing only the end of the program or the entire program. If user 100 wishes to view the entirety of the program, then user 100 may select "needs to be entire show." If user 100 only cares about viewing the end of the program, then user 100 may select "I only care about the end of the show."

Figure 9:
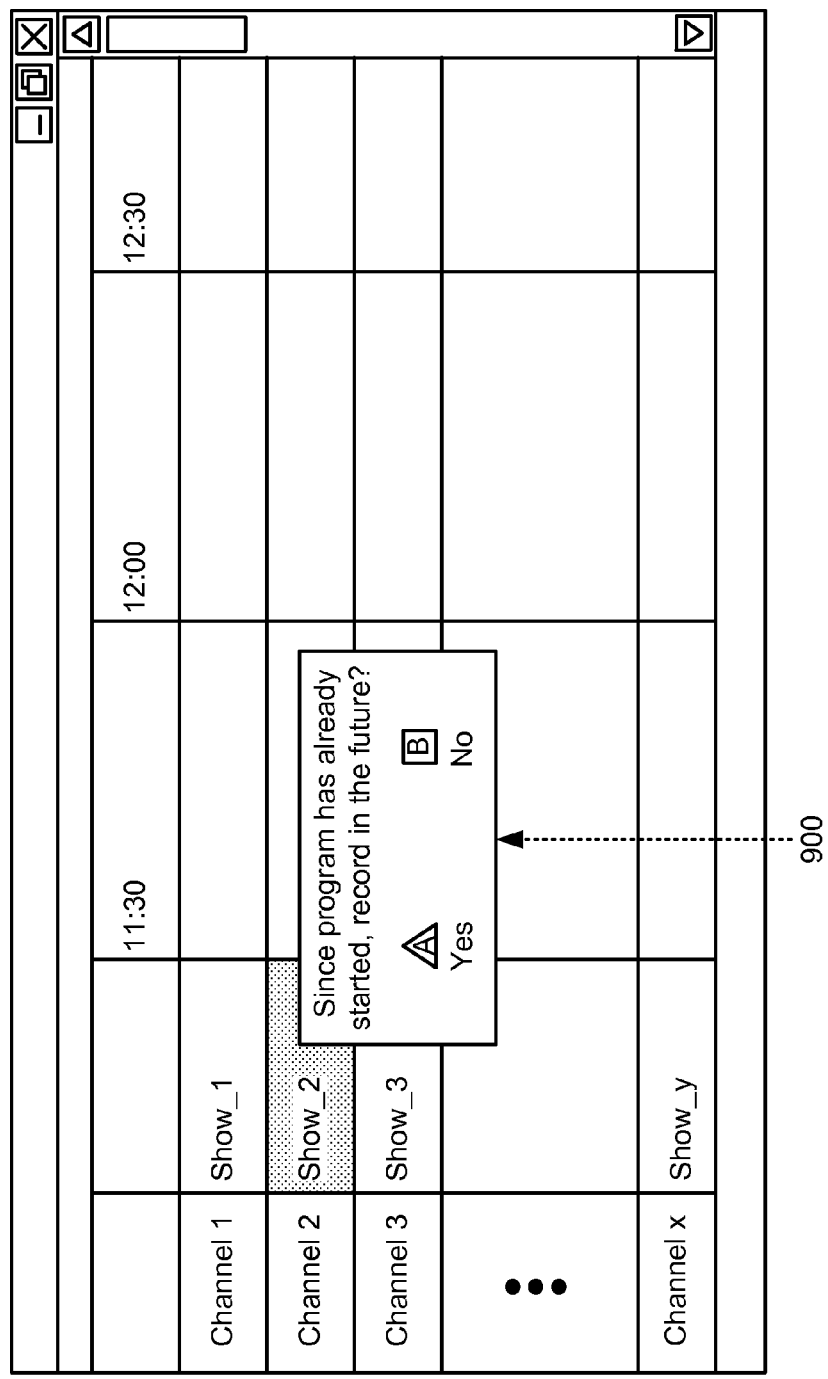
FIGS. 9 and 10 depict non-conflict resolution characteristics that may be selected by a user for recording a program.
Figure 10:
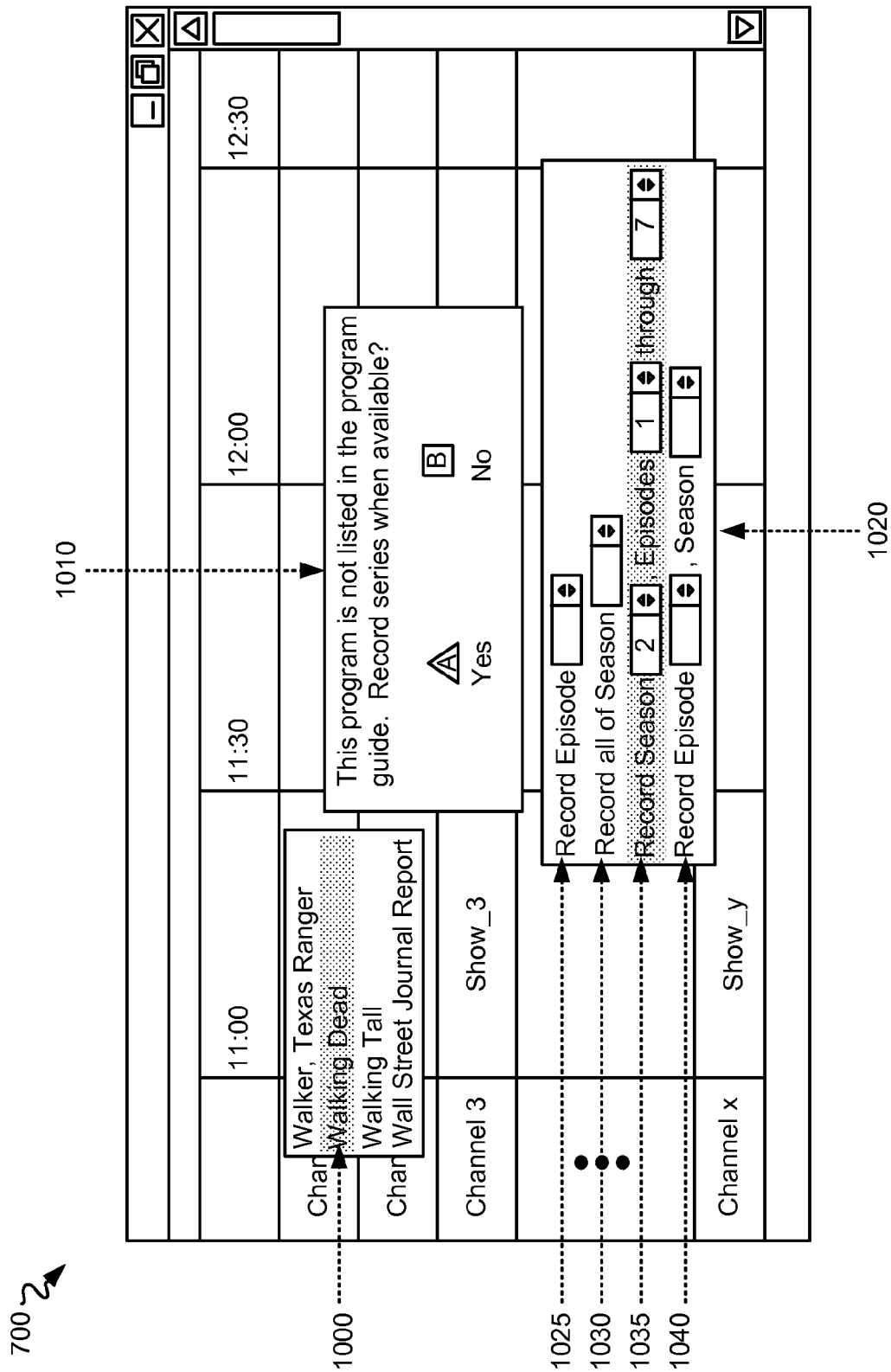

FIGS. 9 and 10 depict non-conflict resolution characteristics that may be selected by user 100 for recording a program. In the example of FIG. 9, if user 100 selects a program from program guide 700 that has already started airing (or, alternatively, just enters the number for the channel the program is airing on), then user 100 may be prompted with an option 900 to record the program at a later time/date. In this case, user 100 may not care whether he/she can watch the program right now, but would like to see the program at some point in time. As shown in the example of FIG. 9, user 100 may be presented with the message "Since program has already started, record in the future?" and may select either a "yes" or a "no."

In the example of FIG. 10, if user 100 attempts to record a program that is not listed in program guide 700, then user 100 may be presented with an option 1010 to record the series when and if it becomes available in the future. As shown in the example of FIG. 10, user 100 may be presented with the message "This program is not listed in the program guide. Record series when available?" If user 100 selects "yes," then user 100 may be prompted with options to record a specific episode 1025 of a program, to record all of a specified season 1030 of a program, to record a specified range of episodes 1035 of a specified season of a program, or to record a specific episode from a specific season 1040 of a program. Based on the option selected by user 100, one or more programs may be set for recording in the future when they become available on the program guide. User 100 may, optionally, specify that user 100 is to be notified based on the occurrence of one or more events, such as, for example, when one or more programs become available on the EPG. For example, user 100 may specify that user 100 is to be notified when a given program has new episodes again, or when a certain season and episode of a given program is showing again.

Figure 11:
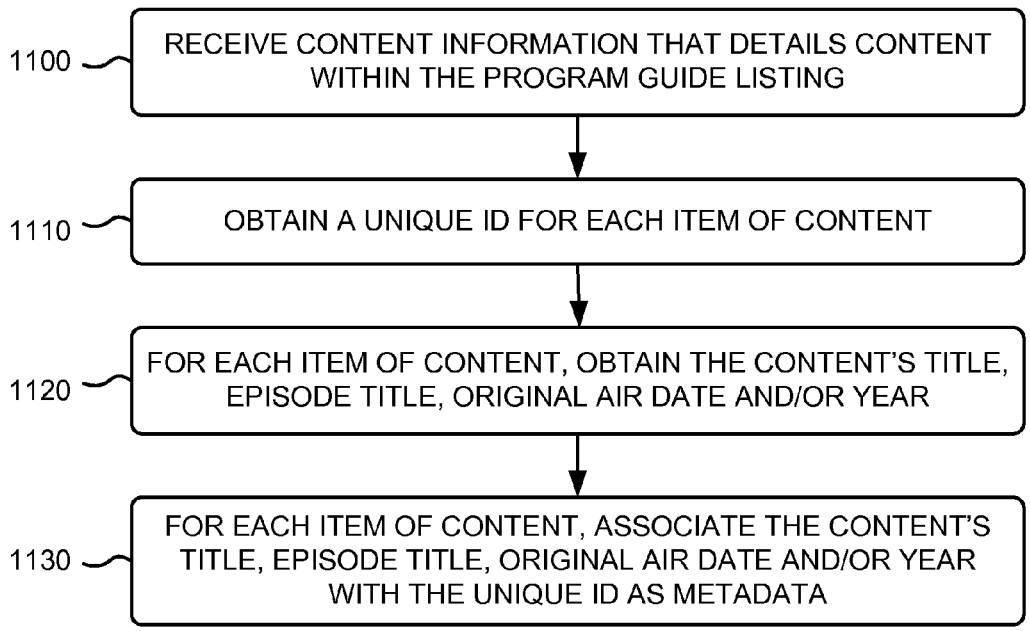
FIG. 11 is a flow diagram that illustrates an exemplary process for associating a unique identifier and other metadata with an item of content contained with an electronic program guide.

FIG. 11 is a flow diagram that illustrates an exemplary process for associating a unique identifier and other metadata with an item of content contained with an EPG. The exemplary process of FIG. 11 may be implemented by EPG server 215 and/or content service provider(s) 205.

The exemplary process may include receiving content information that details content within the program guide listing (block 1100). EPG server 215 may receive, either via manual entry or via electronic delivery, content information for each program contained within the program guide listing maintained by EPG server 215. EPG server 215 may obtain a unique ID for each item of content (block 1100). For each program contained within the program guide listing, EPG server 215 may retrieve, or assign, a unique identifier for the program to serve as an identifier that uniquely identifies each program relative to every other program. EPG server 215 may, for each item of content, obtain the content's title, episode title, original air date, and/or year (block 1120). EPG server 215 may, for example, retrieve the content's title, episode title, original air date and/or year from the content information received in block 1100. EPG server 215 may, for each item of content, associate the content's title, episode title, original air date and/or year with the unique ID as metadata (block 1130). EPG server 215 may store the content's title, episode title, original air date and/or year, obtained in block 1120 as metadata in association with each program's unique ID.

Figure 12:
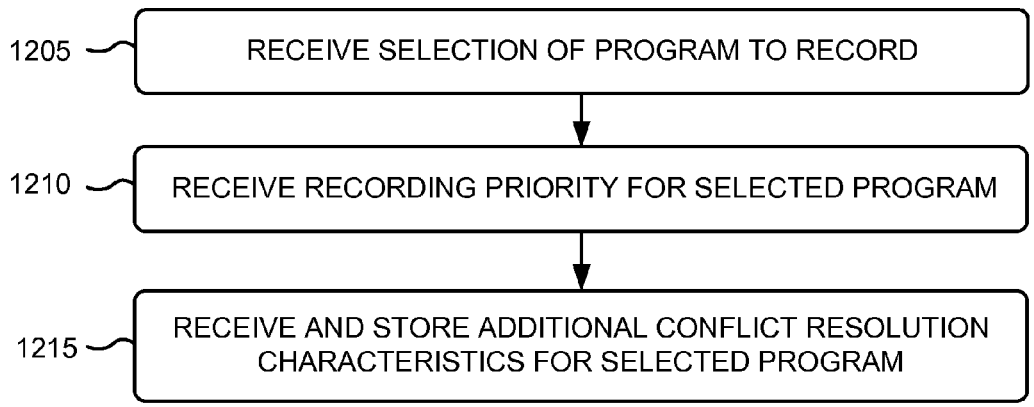
FIG. 12 is a flow diagram that illustrates an exemplary process for user selection of a program to record with a DVR.

FIG. 12 is a flow diagram that illustrates an exemplary process for user selection of a program to record with a DVR. The exemplary process of FIG. 12 may be implemented by device 105. The description of the exemplary process of FIG. 12 refers to the previously described examples of FIGS. 7 and 8.

The exemplary process may include device 105 receiving a selection of a program to record (block 1205). Referring back to FIG. 7, user 100 may select a program 710 from scheduling guide 700 (e.g., using a remote control via STB 300). Device 105 may receive a recording priority for the program selected in block 1205 (block 1210). Referring again to FIG. 7, user 100 may choose "yes" to select an optional recording priority 730, and may further specify either a high, medium or low recording priority to associate with the program selected in block 1205. For example, as shown in FIG. 7, user 100 may choose an "A" to associate a high recording priority with the selected program, a "B" to associate a medium recording priority with the selected program, or a "C" to associate a low recording priority with the selected program. Device 105 may receive and store additional conflict resolution characteristics for the program selected in block 1205 (block 1215). The additional conflict resolution characteristics may, as described above with respect to FIG. 8 include: 1) an indication whether user 100 wishes to watch the program soon after the program begins or whether user 100 wishes to watch the program a period of time after the program begins, 2) an indication whether, if the program is to be recorded as part of a series, the series needs to be recorded sequentially, and/or 3) an indication whether user 100 cares about viewing only the end of the program or the entire program.

Figure 13:
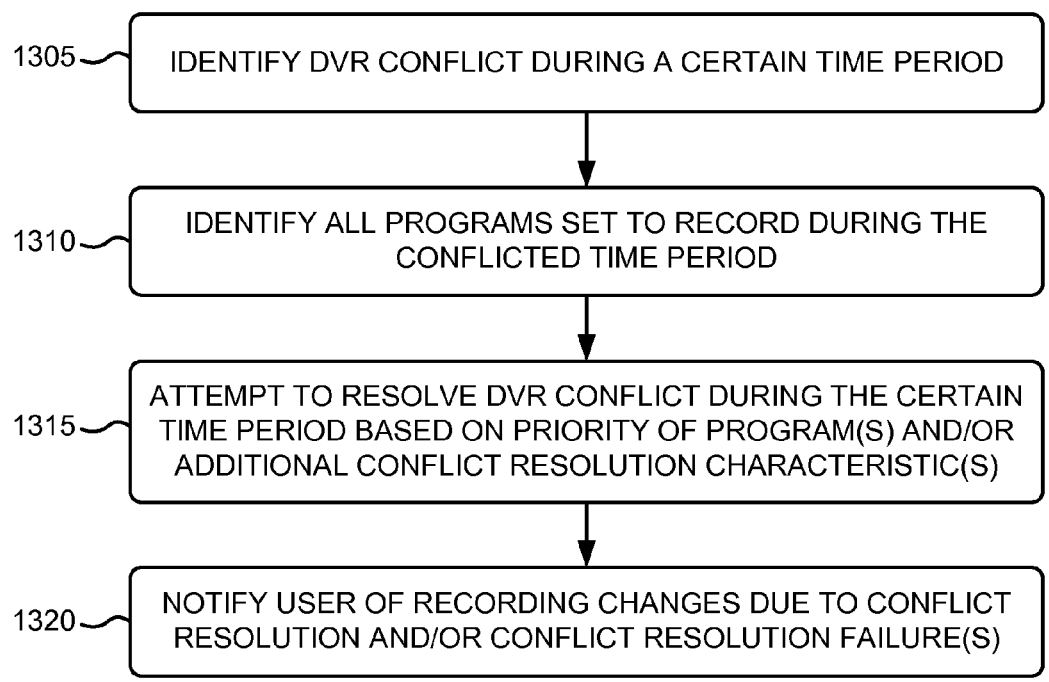
FIG. 13 is a flow diagram that illustrates an exemplary process for resolving DVR conflicts during certain time periods based on conflict resolution characteristics associated with the conflicted programs.

FIG. 13 is a flow diagram that illustrates an exemplary process for resolving DVR conflicts during certain time periods based on conflict resolution characteristics associated with the conflicted programs. The exemplary process of FIG. 13 may be implemented by device 105.

The exemplary process may include device 105 identifying a DVR conflict during a certain time period (block 1305). Device 105 may analyze programs scheduled during various different time periods to, for example, identify whether the number of programs set to record during a certain time period exceeds a maximum number of programs that device 105 may tune to and record at the same time. For example, if device 105 includes a STB, then device 105 may identify whether the number of programs set to record during the certain time period exceeds a maximum number of tuners that device 105 may use at once.

Device 105 may identify all programs set to record during the conflicted time period (block 1310). Device 105 may determine a complete list of programs, including their unique IDs, which are set to record during the conflicted time period. For example, at 11:00 am on January $1^{st}$, programs A, B, C and D may be set to record, when the STB performing the recording only has three tuners available. In this case, a DVR conflict exists because the number of programs set to record exceeds the number of maximum tuners by one.

Device 105 may attempt to resolve DVR conflict(s) during the certain time period based on a priority of the program(s) and/or based on additional conflict resolution characteristics associated with the program(s) (block 1315). Any number of different algorithms may be used to resolve the DVR conflict during the certain time period which take into account the priority of at least one of the conflicted programs and/or based on additional conflict resolution characteristics, such as those described above with respect to FIG. 8. For example, if the number of high priority programs exceeds the maximum number of tuners, then the conflict resolution characteristics described with respect to FIG. 8 above may be used to resolve the DVR conflict between the high priority programs that exceed the maximum number of tuners. One exemplary implementation of DVR conflict resolution is described below with respect to FIGS. 14A-14C. Programs not recorded at the originally scheduled time, or schedule changes that result from the DVR conflict resolution of block 1315, may be made available to user 100 and explicitly noted such that user 100 can know what programs user 100 missed and also keep track of what programs have been re-scheduled to record again at a future time. User 100 may, at any time, cancel a future recording that has been queued in the event that user 100 decides that user 100 no longer cares about that particular program.

Device 105 may notify user 100 of recording changes due to the conflict resolution of block 1315 and/or may notify user 100 of conflict resolution failure(s) (block 1320). For example, if one or more programs have their recording rescheduled to a different time than originally scheduled, then a notification may be sent to user 100 notifying user 100 of the change. If the conflict resolution of block 1315 fails to resolve the DVR conflict, then a notification may be sent to user 100 notifying user 100 of the details of the failure (e.g., the day/time and programs that currently conflict in the schedule). The notification may include a text message, an email, a DVR pop-up notification, a notification via a mobile application (app), etc.

Figure 14A:
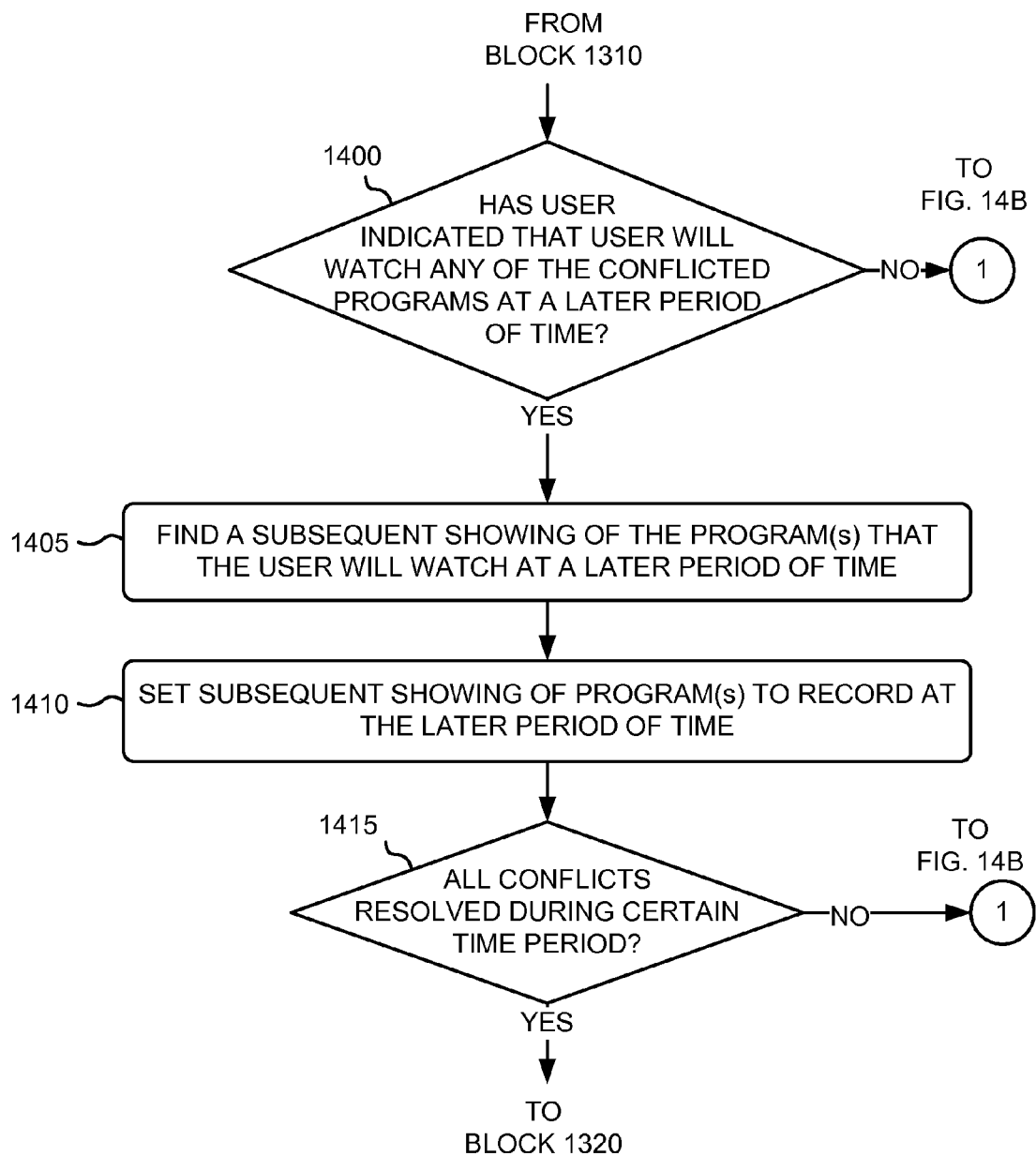
FIGS. 14A-14C is a flow diagram that illustrates an exemplary process for attempting to resolve DVR conflicts during certain time periods.
Figure 14B:
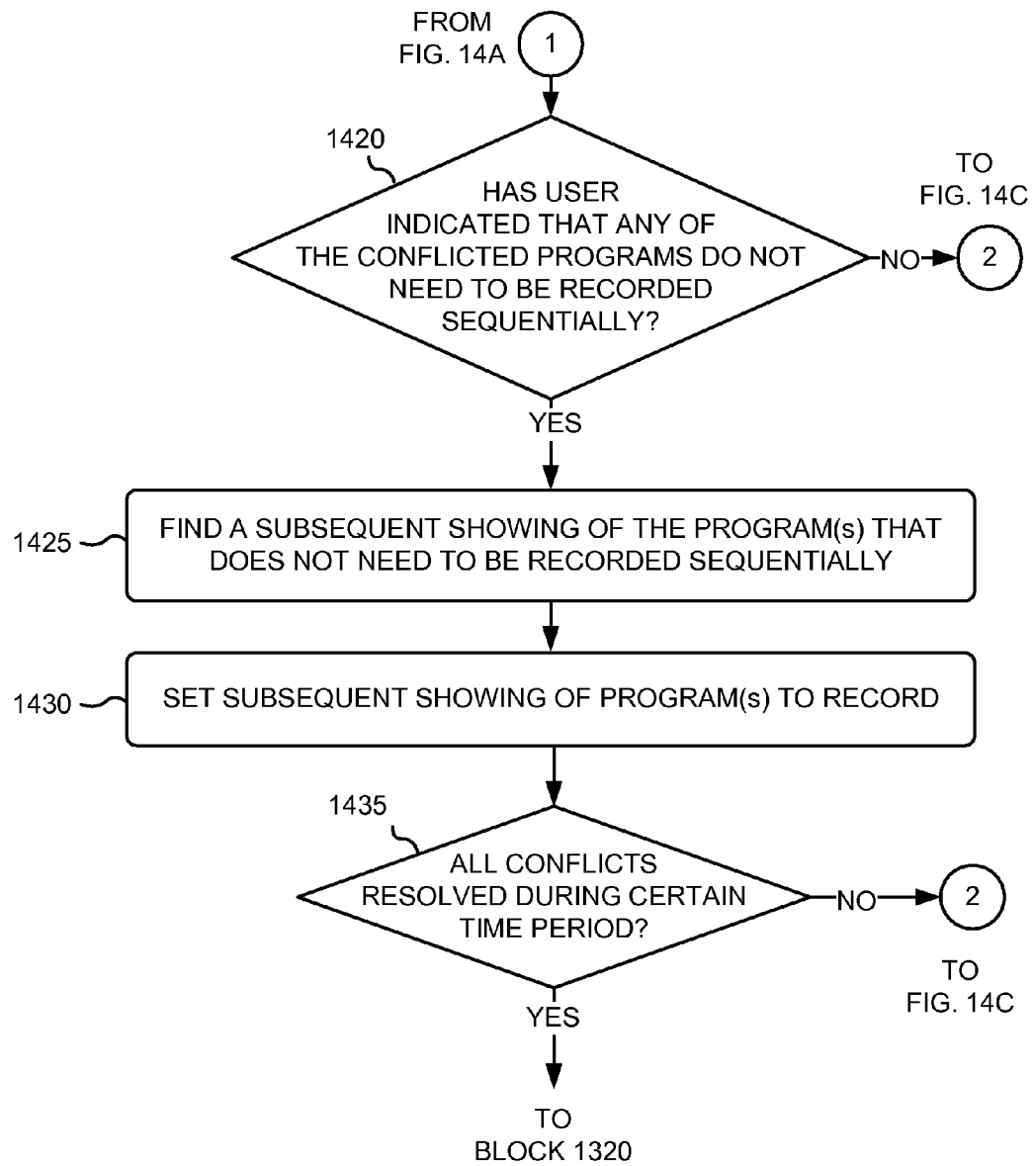
Figure 14C:
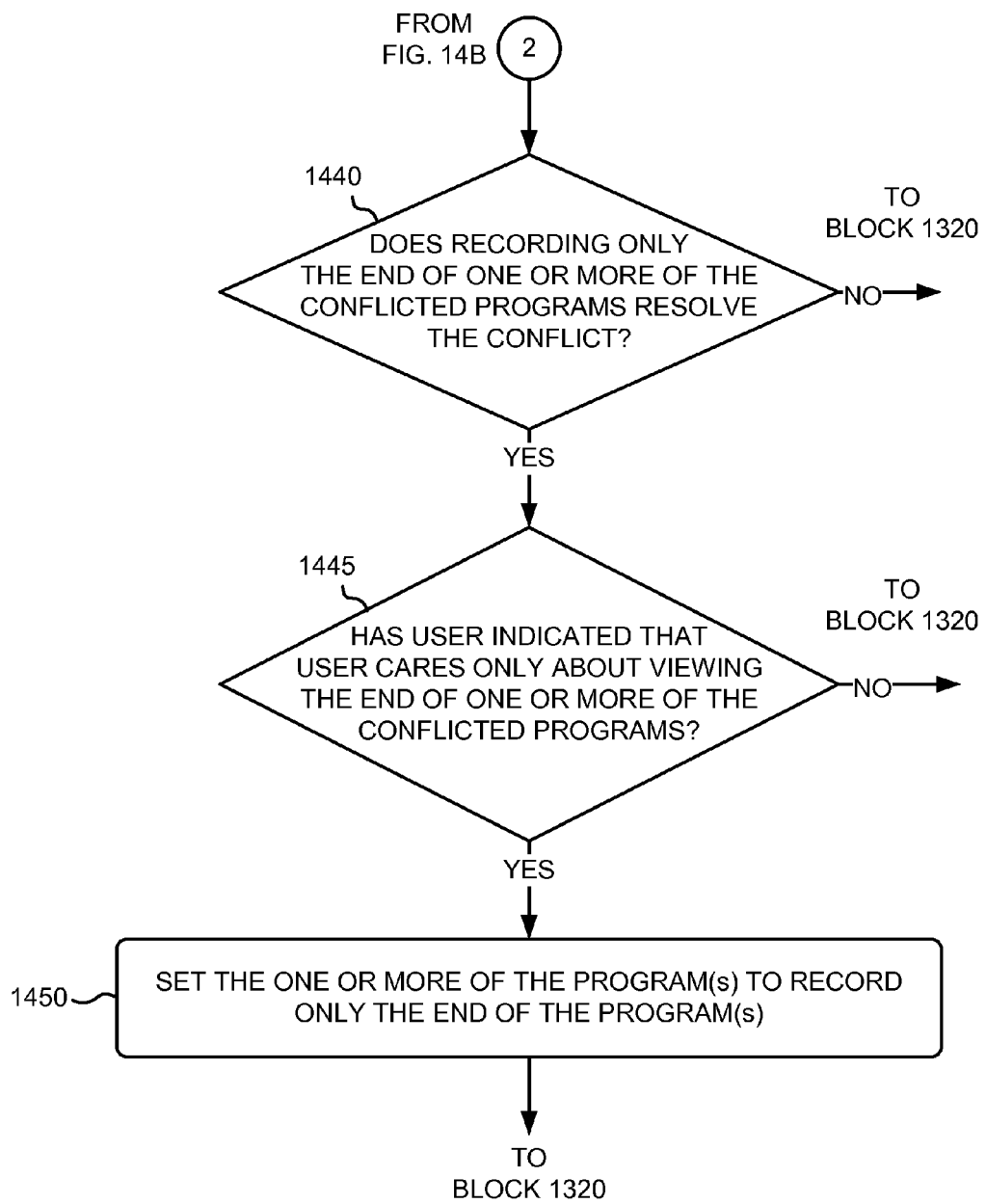

FIGS. 14A-14C is a flow diagram that illustrates an exemplary process for attempting to resolve DVR conflicts during certain time periods. The exemplary process of FIGS. 14A-14C provides further details of an exemplary implementation that corresponds to block 1315 of FIG. 13. The exemplary process of FIGS. 14A-14C may be implemented by device 105. In the exemplary process of FIGS. 14A-14C, a set of programs set to record during a certain time period may have already been identified as causing a DVR conflict in block 1305 of FIG. 13.

The exemplary process may include device 105 determining if user 100 has indicated that user 100 will watch any of the conflicted programs at a later time period (block 1400). Referring to the example of FIG. 8, user 100 may have selected "I want to watch soon after start" or "I will watch later" from program guide 700. If user 100 has not indicated that user 100 will watch any of the conflicted programs at a later time period, then the exemplary process may continue at block 1420. For example, if user 100 has selected "I want to watch soon after start" from program guide 700, then the exemplary process may continue at block 1420.

If user 100 has indicated that user 100 will watch any of the conflicted programs at a later time (YES—block 1400), then device 105 may find a subsequent showing of the program(s) that user 100 will watch at a later period of time (block 1405). For example, if user 100 has selected "I will watch later" from program guide 700, then device 105 may search through the EPG to identify a subsequent showing of one or more of the conflicted programs. If, for example, programs A, B and C conflict during a certain time period, then device 105 may search through the EPG to identify a subsequent showing of program A, B and/or C.

Device 105 may set the subsequent showing of the program to record at the later period of time (block 1410). If device 105 finds a subsequent showing of one or more of the conflicted programs, then device 105 may set the subsequent showing of the program(s) to record at the later time, thereby possible alleviating the DVR conflict during the certain time period. Device 105 may determine if all conflicts have been resolved during the certain time period (block 1415). If not (NO—block 1415), then the exemplary process may continue at block 1420. If all conflicts have been resolved during the certain time period (YES—block 1415), then the exemplary process may continue at block 1320, described above with respect to FIG. 13.

At block 1420, device 105 may determine whether user 100 has indicated that any of the conflicted programs do not need to be recorded sequentially (block 1420). If all of the programs need to be recorded sequentially (NO—block 1420), then the exemplary process may continue at block 1440. If at least one of the conflicted programs does need to be recorded sequentially, then device 105 may find a subsequent showing of the program(s) that does not need to recorded sequentially (block 1425). For example, user 100 may have selected "does not need to be sequential" from program guide 700 of FIG. 8 for a specific program and device 105 may search the EPG for a subsequent showing of the specific program.

Device 105 may set the subsequent showing of the program (s) to record (block 1430). If device 105 finds a subsequent showing of one or more of the conflicted programs, then device 105 may set the subsequent showing of the program(s) to record at the later time, thereby possible alleviating the DVR conflict during the certain time period. Device 105 may determine whether all conflicts have been resolved during the certain time period (block 1435). If not (NO—block 1435), then the exemplary process may continue at block 1440. If all conflicts have been resolved during the certain time period (YES—block 1435), then the exemplary process may continue at block 1320, as described above with respect to FIG. 13.

Device 105 may determine whether recording only the end of one or more of the conflicted programs resolve the conflict (block 1440). For example, programs A, B and C may conflict, but recording only the end of program C (e.g., the last half hour) may resolve the conflict between programs A and C, thus, alleviating the DVR conflict between programs A, B and C. If recording only the end of the one or more of the conflicted programs does not resolve the DVR conflict (NO—block 1440), then the exemplary process may continue at block 1320 in FIG. 13. If recording only the end of one or more of the conflicted programs resolves the conflict (YES—block 1440), then device 105 may determine if user 100 has indicated that the user cares only about viewing the end of the one or more of the conflicted programs (block 1445). For example, if programs A, B and C conflict during a certain time period, than device 105 may determine whether "I only care about the end of the show" has been selected with respect to programs A, B and/or C.

If user 100 has not indicated that user 100 cares only about viewing the end of the one or more of the conflicted programs (NO—block 1440), then the exemplary process may continue at block 1320 in FIG. 13. If user 100 has indicated that the user cares only about viewing the end of at least one of the one or more of the conflicted programs (YES—block 1445), then device 105 may set the one or more of the program(s) to record only the end of the program(s) (block 1450). For example, if user 100 has selected "I only care about the end of the show" for program A, then device 105 may set the DVR to only record a last portion of program A, such as, for example, the last half hour or the last x number of minutes of program A.

As described herein, user-specific conflict resolution characteristics may be used to automatically resolve DVR recording conflicts without further user intervention. When a DVR is scheduled to record too many programs during a given period of time, automatic DVR conflict resolution, as described herein, may be used to resolve the recording conflicts such that all scheduled programs will be recorded either at the originally scheduled time, or at a later time.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIGS. 11-13 and 14A-14C, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A device, comprising:
a memory configured to store recorded video programs; and
a processing unit configured to:
receive, via a user interface associated with the device, input of a user to schedule a program to record at a certain time,
present, via the user interface responsive to receiving the user input to schedule the program to record, user-selectable options for assisting in resolving recording conflicts, wherein the user-selectable options comprise a first user-selectable option that specifies that an entirety of the program needs to be recorded, and a second user-selectable option that specifies that only an end of the program needs to be recorded,
receive, via the user interface, a user selection of either the first user-selectable option or the second user-selectable option,
identify a conflict in the scheduling of the recording of the program with one or more other programs at the certain time,
resolve the identified conflict based on the user selected first option that specifies that an entirety of the program needs to be recorded, or the user selected second option that specifies that only an end of the program needs to be recorded, and
cause at least one of the program or the one or more other programs to be recorded and stored in the memory based on the resolution of the identified conflict.

2. The device of claim 1, wherein the device comprises at least one of a digital video recorder (DVR), a set-top box (STB); a desktop, laptop, palmtop or tablet computer; a cellular telephone; or a personal digital assistant (PDA).

3. The device of claim 1, wherein the processing unit is further configured to:
notify the user of the identified conflict in the scheduling of the recording of the program and the one or more other programs.

4. The device of claim 1, wherein the processing unit is further configured to:
notify the user of the resolution of the identified conflict.

5. The device of claim 1, wherein, when resolving the identified conflict, the processing unit is further configured to:
cause, if the user selection comprises the second option that specifies that only the end of the program needs to be recorded, the end of the program to be recorded in proximity to the certain time if recording only the end of the program resolves the identified conflict with the recording of the program and the one or more other programs at the certain time; or
search, if the user selection comprises the first option that specifies that an entirety of the program needs to be recorded, an electronic program guide to determine a different time than the certain time at which the program is airing and cause the one or more other programs to be recorded at the certain time, and the entirety of the program to be recorded at the different time.

6. A method, comprising:
receiving, at a device, input of a user to schedule a program of a program series to record at a certain time;
presenting to the user, via a user interface associated with the device responsive to receiving the user input to schedule the program series to record, multiple user-selectable options for assisting in resolving recording conflicts, wherein the multiple user-selectable options comprise:
a first user-selectable option that specifies that the program needs to be recorded sequentially, in an order in which programs of the program series were originally aired, with respect to other programs of the program series, and a second user-selectable option that specifies that the program does not need to be recorded sequentially, in the order in which programs of the program series were originally aired, with respect to the other programs of the program series, and/or
a third user-selectable option that specifies that an entirety of the program needs to be recorded, and a fourth user-selectable option that specifies that only an end of the program needs to be recorded;
receiving, by the device when receiving the user input to schedule the program to record, a user selection of either the first user-selectable option or the second user-selectable option, and/or either the third user-selectable option or the fourth user-selectable option;
identifying, by the device, a conflict in scheduling of the recording of the program of the program series with a recording of one or more other programs at the certain time;
resolving, by the device, the identified conflict based on the user selected first or second options, and/or based on the user selected third or fourth options; and
causing, by the device, the program of the program series or the one or more other programs to be recorded at the certain time based on the resolution of the identified conflict,
wherein resolving the identified conflict further comprises:
causing, if the user selection comprises the fourth option that specifies that only the end of the program needs to be recorded, the end of the program to be recorded in proximity to the certain time if recording only the end of the program resolves the identified conflict with the recording of the program and the one or more other programs at the certain time, or
searching, if the user selection comprises the third option that specifies that an entirety of the program needs to be recorded, an electronic program guide to determine a different time than the certain time at which the program is airing and cause the one or more other programs to be recorded at the certain time, and the entirety of the program to be recorded at the different time.

7. The method of claim 6, wherein the device comprises at least one of a digital video recorder (DVR), a set-top box (STB); a desktop, laptop, palmtop or tablet computer; a cellular telephone; or a personal digital assistant (PDA).

8. The method of claim 6, further comprising:
receiving, when receiving the user input to schedule the program to record, a priority parameter that indicates a priority that the program of the program series has relative to other programs;
wherein resolving the identified conflict is further based on the priority parameter.

9. The method of claim 6, wherein resolving the identified conflict comprises:
recording, if the user selection comprises the first option that specifies that the program needs to be recorded sequentially, in the order in which programs of the program series were originally aired, with respect to the other programs of the program series, the program at the certain time; or
searching, if the user selection comprises the second option that specifies that the program does not need to be recorded sequentially, in the order in which programs of the program series were originally aired, with respect to the other programs of the program series, an electronic program guide to determine a different time than the certain time at which the program is airing and cause the one or more other programs to be recorded at the certain time.

10. The method of claim 6, further comprising:
notifying the user of the identified conflict in the scheduling of the recording of the program and the one or more other programs.

11. The method of claim 10, wherein the notifying the user occurs via a text message, an email, a pop-up notification on a digital video recorder (DVR), or an application on a mobile phone.

12. The method of claim 6, further comprising:
notifying the user of the resolution of the identified conflict.

13. A method, comprising:
presenting, by a device, a user interface to a user;
receiving, via the user interface, input of a user to schedule a program to record at a certain time;
presenting, via the user interface responsive to receiving the user input to schedule the program to record, user-selectable options for assisting in resolving recording conflicts, wherein the user-selectable options comprise a first user-selectable option that specifies that an entirety of the program needs to be recorded, and a second user-selectable option that specifies that only an end of the program needs to be recorded;
receiving, via the user interface, a user selection of either the first user-selectable option or the second user-selectable option;
identifying a conflict in the scheduling of the recording of the program with one or more other programs at the certain time;
resolving the identified conflict based on the user selected first option that specifies that an entirety of the program needs to be recorded, or the user selected second option that specifies that only an end of the program needs to be recorded, and
causing at least one of the program or the one or more other programs to be recorded and stored in a memory based on the resolution of the identified conflict.

14. The method of claim 13, further comprising at least one of:
notifying the user of the identified conflict in the scheduling of the recording of the program and the one or more other programs, or
notifying the user of the resolution of the identified conflict.

15. The method of claim 13, wherein resolving the identified conflict comprises:
causing, if the user selection comprises the second option that specifies that only the end of the program needs to be recorded, the end of the program to be recorded in proximity to the certain time if recording only the end of the program resolves the identified conflict with the recording of the program and the one or more other programs at the certain time; or
searching, if the user selection comprises the first option that specifies that an entirety of the program needs to be recorded, an electronic program guide to determine a different time than the certain time at which the program is airing and cause the one or more other programs to be recorded at the certain time, and the entirety of the program to be recorded at the different time.

16. A device, comprising:
a memory configured to store recorded programs;
a processing unit configured to:
receive, via a user interface of the device, input of a user to schedule a program of a program series to record at a certain time,
present to the user, via the user interface responsive to receiving the user input to schedule the program series to record, multiple user-selectable options for assisting in resolving recording conflicts, wherein the multiple user-selectable options comprise:
a first user-selectable option that specifies that the program needs to be recorded sequentially, in an order in which programs of the program series were originally aired, with respect to other programs of the program series, and a second user-selectable option that specifies that the program does not need to be recorded sequentially, in the order in which programs of the program series were originally aired, with respect to the other programs of the program series; and/or
a third user-selectable option that specifies that an entirety of the program needs to be recorded, and a fourth user-selectable option that specifies that only an end of the program needs to be recorded,
receive, when receiving the user input to schedule the program to record, a user selection of either the first user-selectable option or the second user-selectable option, and/or either the third user-selectable option or the fourth user-selectable option,
identify a conflict in scheduling of the recording of the program of the program series with a recording of one or more other programs at the certain time,
resolve the identified conflict based on the user selected first or second options, and/or based on the user selected third or fourth options, and
cause the program of the program series or the one or more other programs to be recorded at the certain time based on the resolution of the identified conflict,
wherein, when resolving the identified conflict, the processing unit is further configured to:
cause, if the user selection comprises the fourth option that specifies that only the end of the program needs to be recorded, the end of the program to be recorded in proximity to the certain time if recording only the end of the program resolves the identified conflict with the recording of the program and the one or more other programs at the certain time, or
search, if the user selection comprises the third option that specifies that an entirety of the program needs to be recorded, an electronic program guide to determine a different time than the certain time at which the program is airing and cause the one or more other programs to be recorded at the certain time, and the entirety of the program to be recorded at the different time.

17. The device of claim 16, wherein the device comprises at least one of a digital video recorder (DVR), a set-top box (STB); a desktop, laptop, palmtop or tablet computer; a cellular telephone; or a personal digital assistant (PDA).

18. The device of claim 16, wherein the processing unit is further configured to:
   receive, via the user interface when receiving the user input to schedule the program to record, a priority parameter that indicates a priority that the program of the program series has relative to other programs,
   wherein resolving the identified conflict is further based on the priority parameter.

19. The device of claim 16, wherein, when resolving the identified conflict, the processing unit is further configured to:
   record, if the user selection comprises the first option that specifies that the program needs to be recorded sequentially, in the order in which programs of the program series were originally aired, with respect to the other programs of the program series, the program at the certain time, or
   search, if the user selection comprises the second option that specifies that the program does not need to be recorded sequentially, in the order in which programs of the program series were originally aired, with respect to the other programs of the program series, an electronic program guide to determine a different time than the certain time at which the program is airing and cause the one or more other programs to be recorded at the certain time.

* * * * *